Feb. 9, 1960 S. V. SONMORE 2,924,057
HAMMERKNIFE ASSEMBLY
Filed March 22, 1957
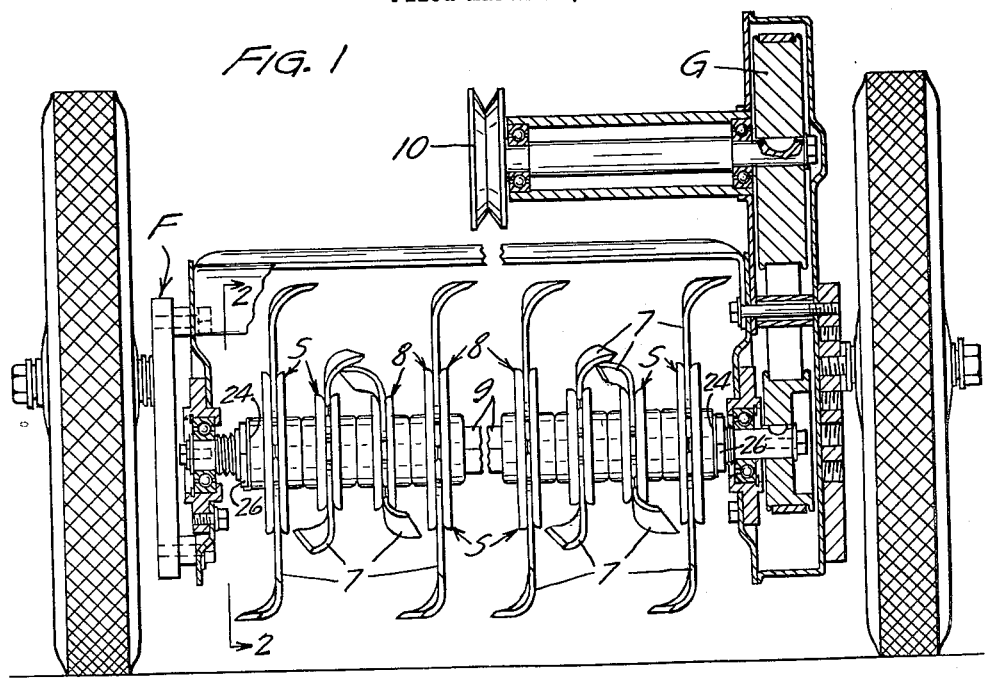
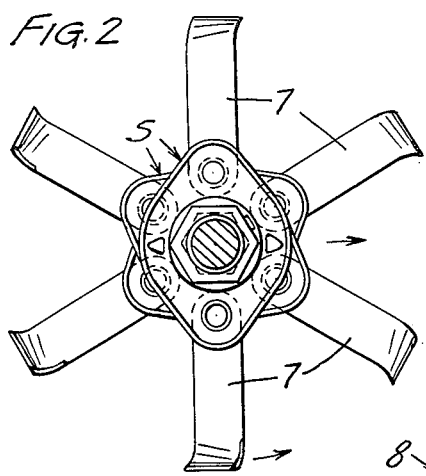
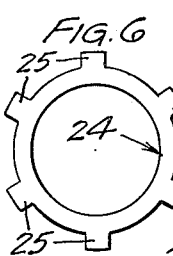
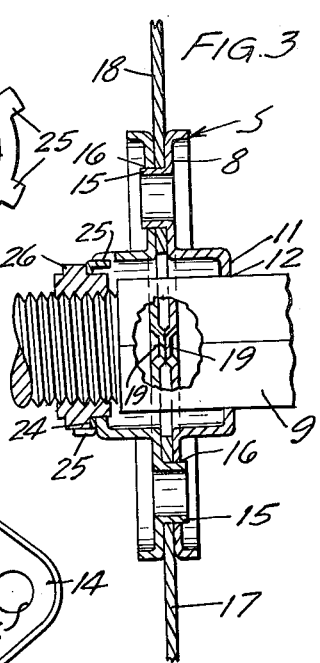
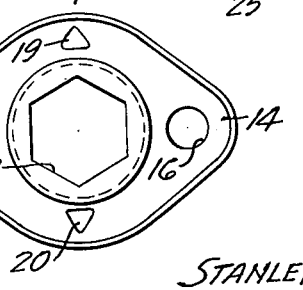
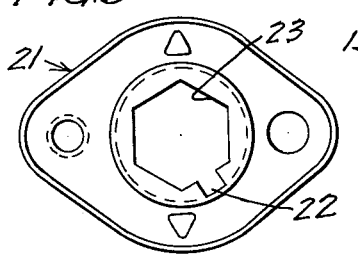
INVENTOR.
STANLEY V. SONMORE
BY
Williamson, Schroeder, Adams & Meyers
ATTORNEYS United States Patent Office 2,924,057
Patented Feb. 9, 1960

2,924,057

HAMMERKNIFE ASSEMBLY

Stanley V. Sonmore, Minneapolis, Minn., assignor to Toro Manufacturing Corporation, Minneapolis, Minn., a corporation of Minnesota Application March 22, 1957, Serial No. 647,851

9 Claims. (Cl. 56—249)

This invention relates to grass cutting machines. More particularly it relates to grass cutting machines which utilize a plurality of overlapping individual blades sometimes referred to as hammerknives, each of which is pivotally mounted for free pivotal movement while revolving with a rapidly rotating transverse shaft.

The mounting of blades or knives of the above type involves a number of problems for the knives must, in order to function properly, be able to pivot freely while revolving. None of the mountings heretofore used have been completely satisfactory from a standpoint of simplicity, ease of assembly, safety and cost of manufacture. My invention eliminates the disadvantages heretofore experienced in such mountings.

It is a general object of my invention to provide a novel and improved mounting for hammerknives which is inexpensive and of simple construction.

A more specific object of my invention is to provide a novel and improved mounting for hammerknives which eliminates parts and substantially reduces manufacturing and assembly costs.

Another object is to provide a novel and improved mounting for hammerknives which increases the safety with which such hammerknives may be used.

Another object is to provide a novel and improved mounting for hammerknives which will eliminate the need for spacers between the respective blade mountings.

Another object is to provide a novel and improved mounting for hammerknives which won't go off center during use as a natural result of the manner in which the blades are mounted.

These and other objects and advantages of my invention will more fully appear from the following description, made in connection with the accompanying drawings, wherein like reference characters refer to the same or similar parts throughout the several views, and in which:

Fig. 1 is a rear elevational view with parts broken away and with parts shown in section of a grass cutting machine utilizing a plurality of pairs of spiders which rotatably mount the hammerknife in a manner in accordance with my invention;

Fig. 2 is a sectional view on an enlarged scale taken along 2—2 of Fig. 1;

Fig. 3 is a fragmentary sectional view taken at right angles to Fig. 2 along line 3—3 of that figure and showing the structure on an enlarged scale;

Fig. 4 is an elevational view on an enlarged scale of one of the plate members used to pivotally mount the hammerknife as shown in Fig. 1;

Fig. 5 is an elevational view on an enlarged scale showing one of the end plate members utilized as an end spider at each end of the shaft shown in Fig. 1; and Fig. 6 is an elevational view on an enlarged scale of the lock washer used to secure the pairs of spiders against longitudinal shifting relative to the power driven rotary shaft upon which they are mounted in Fig. 1.

One embodiment of my invention as shown in Figs. 1–6 includes a plurality of pairs of spiders indicated generally as S which are used to pivotally mount the hammerknives indicated generally as 7. The pairs of spiders S consists of two rigid plate members 8, each of which is identically found relative to the other. These plate members 8 are mounted on a power driven rotary shaft 9 which as best shown in Fig. 2 is hexagonal in cross-sectional configuration. The shaft 9 is mounted on a wheeled frame indicated generally as F, and is driven by gearing indicated generally as G which is connected by means of a pulley 10 to a source of power (not shown).

Each of the plate members 8 is formed of a rigid plate material such as metal and is provided with an offset central portion 11. Formed in this offset central portion and extending normally to the general plane of the plate member 8 is a centrally disposed polygonally-shaped aperture 12. This aperture 12 is of the same shape and size as the cross-sectional configuration of the rotary shaft 9. The opening-defining portions of the plate member 8 which define the opening 12 lock the plate members 8 against rotation relative to the shaft 9 so that the plate members will rotate with the shaft when the latter is driven.

Each of the plate members 8 has a pair of radially and oppositely extending arms 13 and 14. These arms 13 and 14 extend oppositely outwardly and one of the arms 13 is provided with an extruded pivot pin element 15 which extends outwardly in a direction opposite to the offset portion 11 of the plate member and also extends substantially normal to the general plane of the plate member. The other arm 14 has a pivot pin receiving opening 16 formed therethrough, this opening being of the same diameter as the external diameter of the pivot pin 15 and being spaced equidistantly from the centrally disposed aperture 12. The pivot pin receiving opening 16 is adapted to receive therein a pivot pin 15 of an identically formed plate member 8 to pivotally support a rotary blade or hammerknife member such as the knife 17 or 18.

On the side of the plate member from which the pivot pin element 15 extends laterally is a pair of teats 19 and 20. These teats 19 and 20 are spaced equidistantly from the opening 16 and the pivot pin element 15 and are disposed at opposite sides of the centrally disposed aperture 12. These teats extend laterally from the plate member and are adapted to engage the corresponding teats of an adjacent plate member 8 to prevent the two plate members from registering with each other and thereby pinching the blades 17 and 18 therebetween and preventing free rotation upon the pivot pin.

In use the plate members are mounted upon the shaft 9 in pairs as shown in Fig. 1. Reference to Fig. 1 and Fig. 3 will show that the two plate members of each of the pairs of spider teats are assembled on the shaft 9 with their offset central portions extending away from each other and with the pivot pin element 15 of each extending into the aperture 16 of the other. When this is done, the teats 20 of each plate member bears against the teats of the other plate member of the pair so that the plate members cannot come into registering relation. As a result, the blade members 17 and 18 which are placed upon the pivot pin element 15 before the pair of blades is assembled, are free to pivot on the pivot pin element 15 without binding between the two plates. It will be noted that each of the pivot pins 15 are extruded elements formed from the material of the plate member 8.

The pairs of spiders S are preferably mounted upon the shaft 9 in groups of three so that the six blades may be arranged in spiral arrangement and so that the end pairs of blades are radially parallel. The blades must be so arranged so that proper balance is achieved for high speed rotation. Since the shaft 9 is hexagonal in shape, the blades will extend in spiral arrangement outwardly from each side of the shaft 9 and this will provide the necessary balance if the pairs of spiders which are applied to the shaft are assembled in multiples of six.

The pairs of spiders S are prevented from shifting longitudinally of the shaft 9 through the use of an end plate shown in Fig. 5. This end plate 21 is formed identically with the plate members 8 except that it is provided with a lanced slot 22 extending radially outwardly from the central aperture 23 as best shown in Fig. 5. Cooperating with this end plate 21 is a lock washer of the type indicated as 24 in Fig. 6. It will be seen that this lock washer 24 has a plurality of ears 25 extending radially outwardly therefrom. This lock washer is made of bendable material so that when the various pairs of plate members have been assembled on the shaft 9 and the end plate 21 has been applied, the lock washer is applied to the shaft 9 and the hexagonally shaped nut 26 is tightened. One of the ears 25 of the washer 24 is bent over to extend into the lance slot 22 to secure the washer 24 to the end plate. The nut 26 is then tightened and when it has been tightened sufficiently, one or more of the ears 24 are bent outwardly to bear against the side of the nut 26 and lock it against loosening. A similar lock washer and nut is provided at each end of the shaft 9 as well as an end plate 21.

It will be noted that the shape of the opening 12 of each of the plate members 8 is the same as the cross-sectional configuration of the shaft 9 and thus, the plate members 8 rotate with the shaft to cause the blades 7 to revolve around the driven shaft 9.

One of the big advantages of the mounting plates disclosed herein is their simplicity and low cost of manufacture. It will be noted that each of the plate members is identical in size and configuration and each can be manufactured at relatively low cost from a single piece of plate material. Moreover, the pin element 15 is extruded so that the entire mounting plate can be formed in a single operation. This substantially reduces the cost of manufacture.

It will also be noted that in addition to the simplicity and low cost of manufacture afforded by my invention, I have eliminated a considerable number of parts which have heretofore been required for mounting hammerknives. I have eliminated the need for a separate pivot pin and cotter keys or other means for holding the pivot pin within the mounting plates. I have also eliminated the spacers which have heretofore been required between the individual sets of spiders or mounting plates. By reference to Fig. 1, it will be readily seen that the offset portions 11 of the plate members 8 perform the spacing functions heretofore performed by separate spacer elements which were disposed between the pairs of mounting plates. It is obvious that by eliminating these parts, I have substantially reduced the manufacturing cost. In addition, the elimination of these parts substantially reduces the assembly cost and the cost of maintenance. There is no need for replacement of parts such as pivot pins which have heretofore become loose and lost, thus decreasing the cost of maintenance substantially.

It should also be noted that the mounting plates disclosed herein substantially increase the safety with which hammerknives of this type can be utilized. There is no danger when using the mounting plates disclosed and claimed herein of a pin which supports the blade coming loose and the blade flying through the air with consequent injury to the user or a bystander. Since I have eliminated the use of the separate pivot pin, there is no possibility of a cotter key or the like coming loose with the result that the pin falls out and the blade flies through the air causing injury to the user or observers. When the knife 7 is mounted between two of the blades 8 as shown herein, there is no possible way that the blades can escape short of a complete wearing out of the pivot pin element 15. Before the complete pivot pin 15 would wear out, the user would observe that the blades 7 would not be swinging properly and the plate members 8 could be replaced.

It should also be noted that the hexagonal shape of the shaft 9 and the hexagonal shape of the openings 12 of the plate members 8 prevent the blades from shifting to an off-center position during rotation. With a square shaft the plate members would tend to shift slightly during rotation with a result that the blades would be slightly off-center and the necessary proper balance would be destroyed. Such improper balance is impossible when using the construction disclosed herein.

It will, of course, be understood that various changes may be made in the form, details, arrangement and proportions of the parts without departing from the scope of my invention which consists of the matter shown and described herein and set forth in the appended claims.

What I claim is:

1. A hammerknife spider comprising a rigid plate member having a centrally disposed aperture formed therethrough and extending normally to the general plane of said member and adapted to receive therein and to be secured against relative rotation to a power-driven rotary shaft, said plate member having a pair of oppositely outwardly extending arms, one of said arms having an integrally formed pivot pin element extending laterally therefrom and the other of said arms having an opening formed therethrough of sufficient size to receive therein a pivot pin of a size equal to said pivot pin element, said pivot pin element and said opening being spaced equidistantly from said centrally disposed aperture, said pivot pin element providing a pivotal mounting for a hammerknife disposed between said plate member and a substantially identical cooperating plate member, and means carried by said plate member for preventing said plate member from moving into registering relation with a substantially identical plate member when both are mounted on such a shaft.

2. A hammerknife spider comprising a rigid plate member having a centrally disposed aperture formed therethrough and extending normally to the general plane of said member and adapted to receive therein and to be secured against relative rotation to a power driven rotary shaft, said plate member having a pair of oppositely outwardly extending arms, one of said arms having an integrally formed pivot pin element extending laterally therefrom and the other of said arms having an opening formed therethrough of sufficient size to receive therein a pivot pin of a size equal to said pivot pin element, said pivot pin element and said opening being spaced equidistantly from said centrally disposed aperture, said pivot pin element providing a pivotal mounting for a hammerknife disposed between said plate member and a substantially identical cooperating plate member, and spacer elements carried by said plate member and extending laterally therefrom in the same direction as said pivot pin element for preventing said plate member from moving into registering relation with a substantially identical plate member when both are mounted on such a shaft.

3. A hammerknife spider comprising a rigid plate member having a centrally disposed polygonally-shaped aperture formed therethrough and extending normally to the general plane of said member and adapted to receive therein and to be secured against relative rotation to a power driven rotary shaft, said plate member having a pair of oppositely outwardly extending arms, one of said arms having portions thereof extruding laterally to form a pivot pin element and the other of said arms having an opening formed therethrough of sufficient size to receive therein a pivot pin of equal size, said pivot pin element and said opening being spaced equidistantly from said centrally disposed aperture, said pivot pin element providing a pivotal mounting for a hammerknife disposed between said plate member and a substantially identical cooperating plate member, and means carried by said plate member for preventing said plate member from moving into registering relation with a substantially identical plate member when both are mounted on such a shaft.

4. A hammerknife spider comprising a rigid plate member having a centrally disposed polygonally-shaped aperture formed therethrough and extending normally to the general plane of said member and adapted to receive and engage therein against relative rotation a power driven rotary shaft having a cross-sectional configuration of substantially the same shape, said plate member having a pair of oppositely outwardly extending arms, one of said arms having portions thereof bent laterally to form a pivot pin element adapted to pivotally support a hammerknife and the other of said arms having an opening formed therethrough of sufficient size to receive therein a pivot pin of equal diameter, said pin element and said opening being spaced equidistantly from said centrally disposed aperture, said pivot pin element constituting the sole pivotal mounting for a hammerknife disposed between said plate member and a substantially identical cooperating plate member, and a pair of spacer teats carried by said plate member and extending laterally in the same direction as said pin element, said spacer teats being arranged at opposite sides of said aperture and being spaced equidistantly between said pin and said opening.

5. A hammerknife spider comprising a rigid plate member having a centrally disposed polygonally-shaped aperture therethrough and extending normally to the general plane of said member and adapted to receive and engage therein against relative rotation a power driven rotary shaft having a cross-sectional configuration of substantially the same shape, said plate member having a pair of oppositely outwardly extending arms, one of said arms having an integrally formed pivot pin element extending laterally therefrom and the other of said arms having an opening formed therethrough of sufficient size to receive therein a pivot pin of a size equal to said pivot pin element, said pivot pin element and said opening being spaced equidistantly from said centrally disposed aperture, the aperture defining portions of said plate member being offset relative to the general plane of said plate member in a direction opposite to the direction in which said pin element extends from said plate member, said pivot pin element constituting the sole pivotal mounting for a hammerknife disposed between said plate member and a substantially identical cooperating plate member, and spacer carried by said plate member for preventing said plate member from registering with a substantially identical plate member when both are mounted on such a shaft and the pivot pin element of each is inserted within the opening of the other.

6. A hammerknife assembly comprising a pair of rigid plate members each having a centrally disposed aperture formed therethrough and extending normally to the general plane of said member and adapted to receive therein and to be secured against relative rotation to a power-driven rotary shaft having a cross-sectional configuration of the same shape, each of said plate members having a pair of oppositely outwardly extending arms, one of said arms of each of said plate members having an integrally formed pivot pin element extending laterally therefrom and the other of said arms of each of said plate members having a pivot pin-receiving opening formed therethrough of substantially the same diameter as the pivot pin element of the other of said plate members the pivot pin element of each of said plate members being spaced from its centrally disposed aperture a distance equal to the spacing of the opening of the other plate member from its centrally disposed aperture to permit the pivot pin elements of each of said plate members to be simultaneously received in the openings of the other plate member for pivotally mounting a hammerknife on each of said pivot pin elements, said pivot pin elements constituting the sole means on said plate members for pivotally mounting a hammerknife disposed between said plate members and spacer means carried by at least one of said plate members for preventing said pin elements from extending sufficiently far into said openings to cause a hammerknife, when so mounted, to be held against free pivotal movement between said plate members.

7. A hammerknife assembly comprising a power-driven rotary shaft having a polygonally-shaped cross-sectional configuration, a plurality of pairs of substantially identical spiders mounted on said shaft longitudinally thereof and for rotation therewith, each of said spiders consisting of a rigid plate member having a centrally disposed polygonally-shaped aperture through which said shaft extends, said aperture having the same shape as the cross-sectional configuration of said shaft and being of substantially the same size to preclude relative rotation therebetween, each of said plate members having a pair of oppositely extending radial arms, one of said arms of each of said plate members having an integrally formed pivot pin element extending laterally therefrom and the other of said arms having a pin-receiving opening formed therethrough, the opening of each of said plate members being of a size substantially equal to the external size of the pivot pin element of the other plate member in that pair and being spaced from its centrally disposed aperture a distance equal to the spacing between the pivot pin element and the centrally disposed aperture of the other plate member in that pair, the pivot pin elements of each plate member of a particular pair being received in the pin-receiving openings of the other plate member of that pair, a hammerknife pivotally mounted on each of said pivot pin elements between the plate members of each pair for free pivotal movement thereabout and extending outwardly therefrom, and spacer means extending between the plate members of each pair and maintaining the same in spaced relation to preclude said hammerknife from being held against free pivotal movement between the plate members.

8. The structure defined in claim 7 wherein said shaft has more than four sides.

9. The hammerknife assembly defined in claim 7 wherein the central aperture-defining portions of each of said plate members is offset relative to the general plane of said plate member in a direction opposite to the direction in which said pin element extends from said plate member and abuts against the aperture-defining portions of its adjacent plate member.

References Cited in the file of this patent

UNITED STATES PATENTS

| | | |
|---|---|---|
| 1,780,247 | Simpson | Nov. 4, 1930 |
| 2,115,265 | Jennett | Apr. 26, 1938 |
| 2,505,089 | Bailey et al. | Apr. 25, 1950 |
| 2,509,343 | Henderson | May 30, 1950 |